United States Patent [19]
Leifeld

[11] Patent Number: 5,619,772
[45] Date of Patent: Apr. 15, 1997

[54] SLIVER GUIDE ASSEMBLY INCLUDING A THICKNESS SENSOR AND A MOVABLE COUNTERELEMENT

[75] Inventor: Ferdinand Leifeld, Kempen, Germany

[73] Assignee: Trützschler GmbH & Co. KG, Mönchengladbach, Germany

[21] Appl. No.: 549,311

[22] Filed: Oct. 27, 1995

[30] Foreign Application Priority Data

Oct. 31, 1994 [DE] Germany ............ 44 38 884.5

[51] Int. Cl.⁶ ............................................. D01H 5/32
[52] U.S. Cl. ............................ 19/240; 19/288; 19/292; 19/0.23
[58] Field of Search .................... 19/0.23, 106 R, 19/236, 239, 240, 243, 287, 288, 291, 292, 150, 157, 258; 73/159, 160

[56] References Cited

FOREIGN PATENT DOCUMENTS

| 930370 | 7/1955 | Germany . |
|---|---|---|
| 1118068 | 11/1961 | Germany . |
| 3133818 | 3/1983 | Germany . |
| 3807582 | 9/1989 | Germany . |
| 3834110 | 4/1990 | Germany . |
| 4017064 | 2/1991 | Germany . |
| 4404326 | 10/1994 | Germany . |
| 609753 | 10/1948 | United Kingdom . |
| 1416094 | 12/1975 | United Kingdom . |
| 2231343 | 11/1990 | United Kingdom . |
| 2273509 | 6/1994 | United Kingdom . |
| 87/04472 | 7/1987 | WIPO . |
| 91/16595 | 10/1991 | WIPO . |

*Primary Examiner*—Michael A. Neas
*Attorney, Agent, or Firm*—Spencer & Fran

[57] ABSTRACT

An apparatus for measuring sliver thickness in a drawing frame includes a sliver guiding device having converging inner wall faces for bringing a plurality of simultaneously introduced slivers together to form a sliver assembly constituted by side-by-side positioned running slivers arranged in a plane. The apparatus further includes a sensor element laterally contacting the sliver assembly; and a counterelement laterally contacting the sliver assembly. The counterelement is so supported that it may pivot parallel to the plane of the sliver assembly for purposes of adjustment and immobilization. The sensor element is urged into a resilient contact with the sliver assembly whereby the sensor element undergoes excursions upon variation of thickness of the sliver assembly. The sensor element and the counterelement together define a constriction through which the sliver assembly passes. A transducer converts excursions of the sensor element into electric pulses. A withdrawing roller pair supported downstream of the sliver guiding device pulls the sliver assembly through the sliver guiding device.

5 Claims, 6 Drawing Sheets

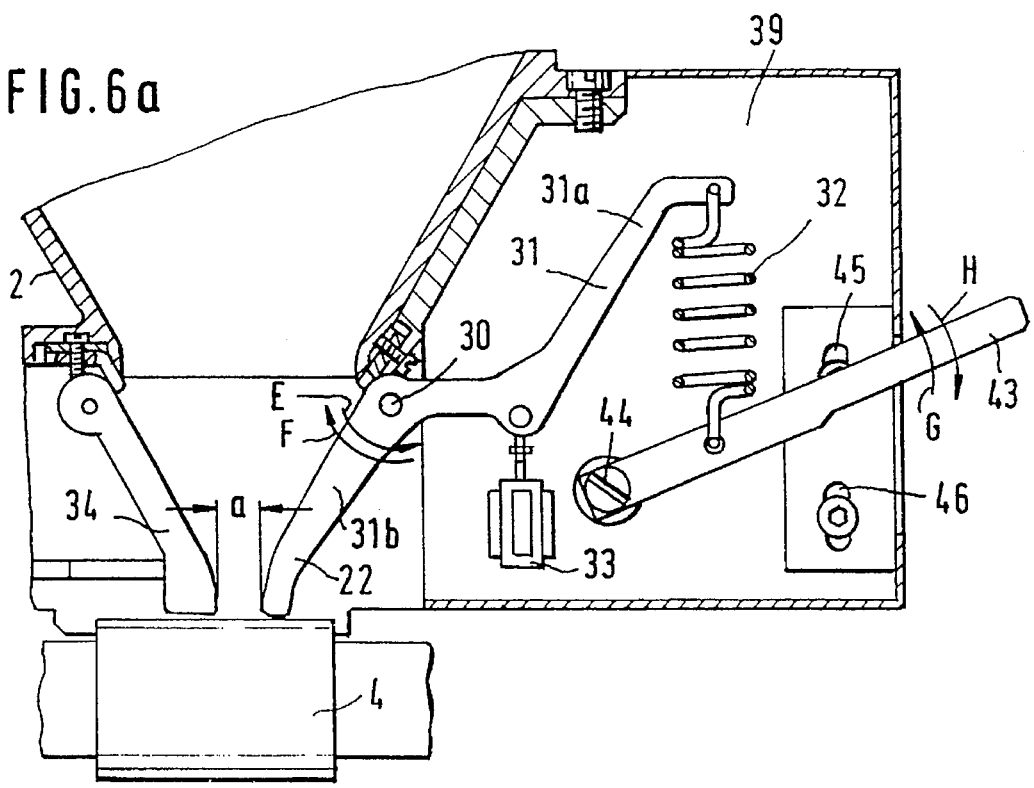
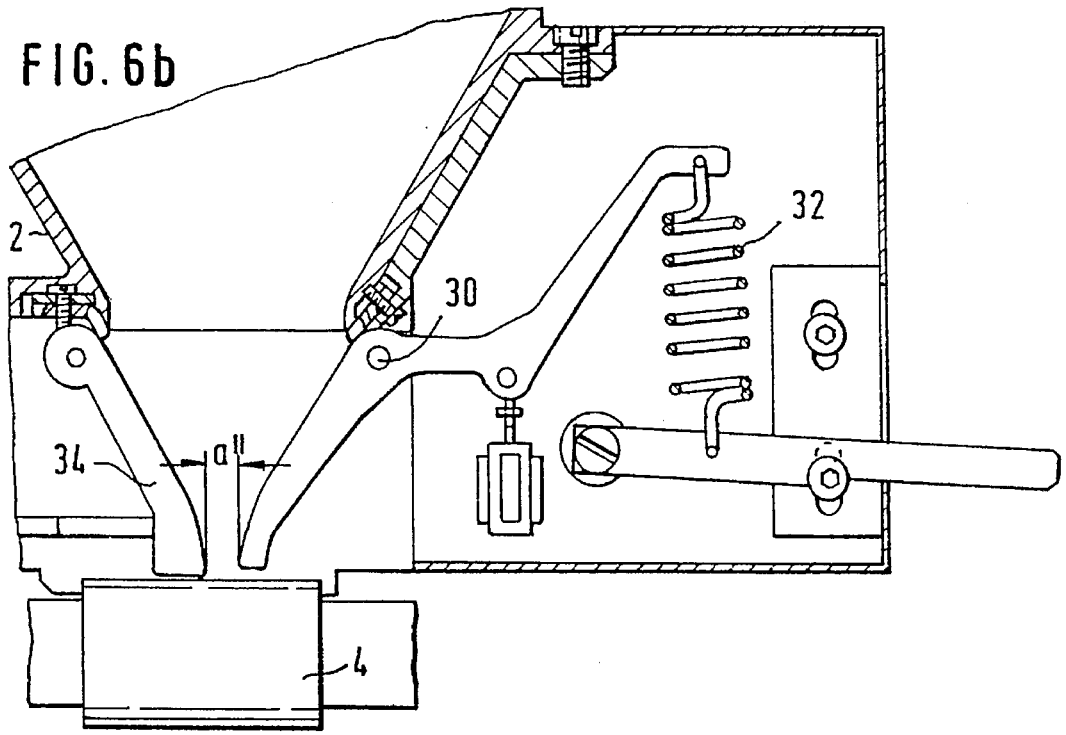

SLIVER GUIDE ASSEMBLY INCLUDING A THICKNESS SENSOR AND A MOVABLE COUNTERELEMENT

CROSS REFERENCE TO RELATED APPLICATION

This application claims the priority of German Application No. P 44 38 884.5, filed Oct. 31, 1994.

BACKGROUND OF THE INVENTION

This invention relates to an apparatus for measuring the sliver thickness in a drawing frame, particularly in a regulated drawing frame. The apparatus includes a sliver guiding device for guiding a plurality of simultaneously inputted fiber slivers at the inlet of the drawing frame. At least parts of the inner wall faces of the guiding device converge such that the side-by-side running slivers are brought together to form a sliver assembly in which the slivers assume a side-by-side contacting relationship in a single plane. Downstream of the guiding device, as viewed in the direction of sliver run, a roller pair is arranged which defines a nip through which the sliver assembly passes. By virtue of the frictional engagement in the nip, the roller pair pulls the sliver assembly through the sliver guiding device. Downstream of the roller pair the slivers diverge from one another. The sliver guiding device is associated with a biased, movable sensor element which, together with an operationally stationary counterelement (wall element), constitutes a constriction for the throughgoing sliver assembly. The sensor element executes excursions as the thickness of the sliver assembly changes. The displacements of the sensor element are applied to a transducer which, in response, generates control pulses. The counterelement situated opposite the sensor element may be adjusted and immobilized in its adjusted position.

In a known arrangement of the above-outlined type the counterelement is shiftable towards or away from the sensor element and may be immobilized in its adjusted position by a setscrew. The purpose of such an adjustment is to adapt the sliver guiding device to different fiber batches, particularly when the type of fiber is changed or the number of the parallel running slivers is altered.

SUMMARY OF THE INVENTION

It is an object of the invention to provide an improved apparatus of the above-outlined type in which the sliver guidance between the sensor element and the counterelement is improved.

This object and others to become apparent as the specification progresses, are accomplished by the invention, according to which, briefly stated, the apparatus for measuring sliver thickness in a drawing frame includes a sliver guiding device having converging inner wall faces for bringing a plurality of simultaneously introduced slivers together to form a sliver assembly constituted by side-by-side positioned running slivers arranged in a plane. The apparatus further includes a sensor element and a counterelement laterally contacting the sliver assembly from opposite sides. The counterelement is so supported that it may pivot parallel to the plane of the sliver assembly-for purposes of adjustment and immobilization. The sensor element is urged into a resilient contact with the sliver assembly whereby the sensor element undergoes excursions upon variation of thickness of the sliver assembly. The sensor element and the counterelement together define a constriction through which the sliver assembly passes. A transducer converts excursions of the sensor element into electric pulses. A withdrawing roller pair supported downstream of the sliver guiding device pulls the sliver assembly through the sliver guiding device.

By virtue of the fact that the counterelement is rotatable, the guidance of the slivers in case of change in the type or number of slivers is improved. The alteration of the angle between the counterelement and the lateral wall surfaces of the guiding device permits an adaptation when a change in the processing of the slivers occurs.

BRIEF DESCRIPTION OF THE DRAWINGS

FIG. 4a is an enlarged top plan view of a detail of FIG. 3a.

FIGS. 6a and 6b are sectional top plan views of another preferred structural embodiment of the invention, showing two different operational positions.

DESCRIPTION OF THE PREFERRED EMBODIMENTS

Figure 1A:
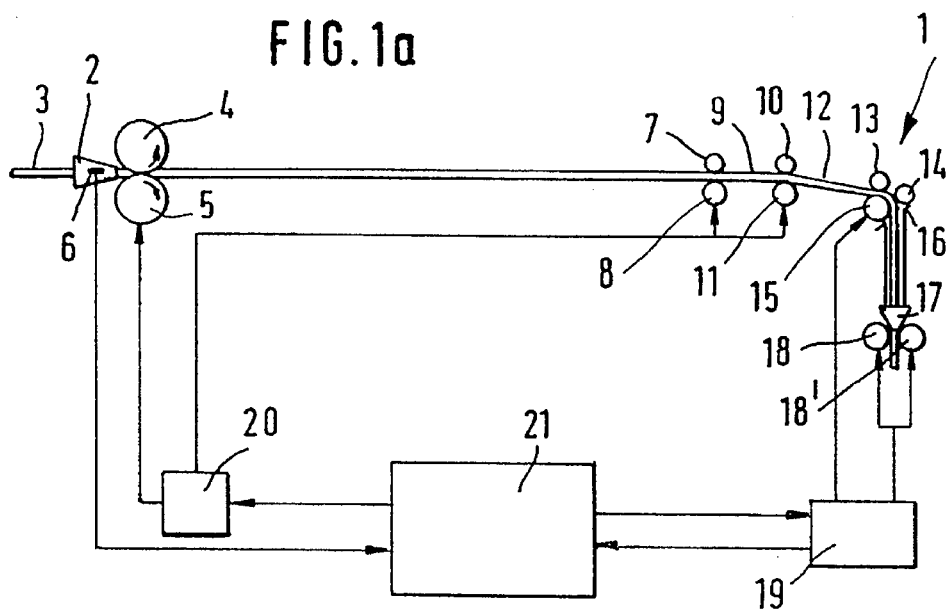
FIG. 1a is a schematic side elevational view, with block diagram, of a regulated drawing frame, incorporating the invention.

FIG. 1a illustrates a high production drawing frame which may be, for example, an HS 900 model, manufactured by Trützschler GmbH & Co. KG, Mönchengladbach, Germany. A plurality of slivers 3, paid out from non-illustrated coiler cans, enter a sliver guiding device 2, through which they are drawn and further advanced by a pair of cooperating withdrawing rollers 4 and 5. In their travel through the sliver guiding device, the slivers 3 move past a measuring member 6. The drawing frame 1 includes an upper inlet roller 7 and a lower inlet roller 8 which are associated with the pre-drawing zone 9 delimited at the downstream end by the upper predrawing roller 10 and the lower predrawing roller 11. Between the roller pair 10, 11 as well as a roller pair formed of the upper main drawing roller 13 and the lower main drawing roller 15 the main drawing zone 12 extends. The lower main drawing roller 15 is associated with a second upper main drawing roller 14. Such an arrangement is referred to as a four over three drawing system.

The drafted slivers 3, after passing through the roller pair 14, 15, reach the inlet of a sliver guide 16 and are drawn through a sliver trumpet 17 arranged at the downstream end of the sliver guide 16 by cooperating delivery rolls 18, 18'. In the sliver trumpet 17 the slivers are combined into a single sliver deposited into a non-illustrated coiler can. The main drawing rollers 13, 14, 15 and the delivery rollers 18, 18' are driven by a main motor 19 controlled by a computer 21. The signals generated by the measuring member 6 at the sliver guiding device 2 are applied to the computer 21 and are converted into control signals which are applied to a regulating motor driving the withdrawing rollers 4, 5 as well as the rollers 7, 8, 10 and 11 of the pre-drawing zone 9. According to the signals of the measuring unit 6, representing the fluctuating thickness values of the sliver assembly formed of the slivers 3, the computer 21 sends control signals to the regulating motor 20 which accordingly varies the rpm's of the rollers 4, 5, 7, 8, 10 and 11.

Figure 1B:
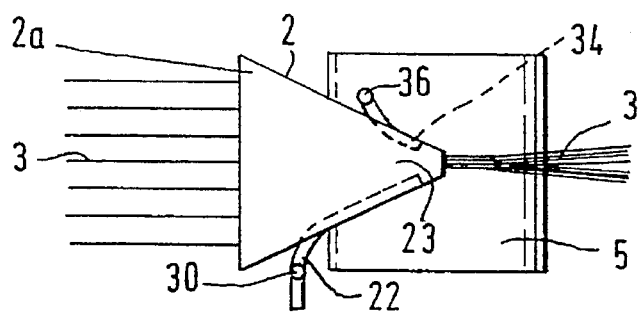
FIG. 1b is an enlarged top plan view of a component illustrated in FIG. 1a, showing further details.

Turning to FIG. 1b, in the top plan view illustrated therein the upper withdrawing roller 4 is not shown for clarity. The slivers 3 are brought together in the sliver guiding device 2 to form the sliver assembly in which the individual slivers are in a mutually contacting relationship and extend in a single plane. The measuring unit 6 symbolically shown in FIG. 1a includes a sensor element 22 which is rotatably supported by a bearing 30 for swinging motions in a direction parallel to the single plane in which the slivers 3 of the sliver assembly lie. The structure and function of the sensor element 22 will be described later.

Opposite the sensor element 22 a counterelement 34 is provided which is adjustable to vary, in cooperation with the sensor element 22, the passage width of a constriction 23 at the outlet end of the sliver guiding device 2. As will be described later, the counterelement 34 is adjustable by swinging it about a pivot 36 in a direction parallel to the single plane in which the slivers 3 of the sliver assembly lie. The counterelement 34 may be immobilized in its adjusted position, as will also be described later.

Figure 2:
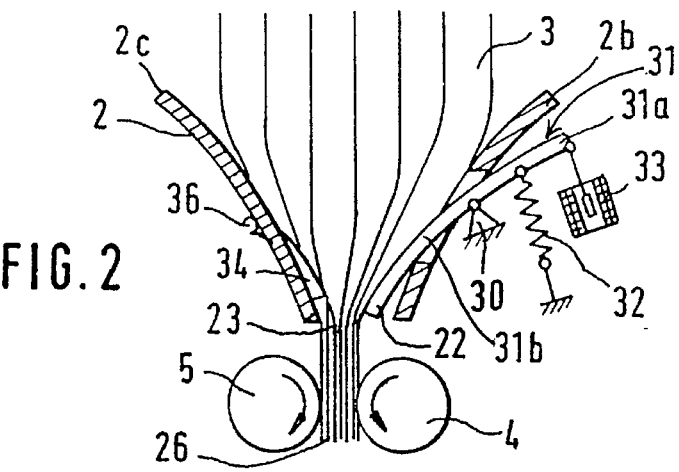
FIG. 2 is a sectional top plan view of the component illustrated in FIG. 1b, showing further details.

FIG. 2 shows how the individual slivers 3 are brought together by the sliver guiding device 2 to assume therein a side-by-side contacting relationship to form the sliver assembly and how they are sensed in the constriction 23 by means of the sensor element 22. The sensor element 22 has a lever arm 31a which is exposed to the pulling force of a tension spring 32 and is coupled with a measuring element 33 which may be a plunger-and-solenoid arrangement. Another lever arm 31b laterally continuously engages with its free end the sliver assembly formed of slivers 3. Thickness changes in the throughgoing fiber quantities of the slivers 3 are thus sensed as volume changes. Departing from FIG. 1b, the withdrawing rollers 4 and 5 are arranged vertically, that is, the slivers are laterally clamped by the nip 26 of the rollers 4 and 5.

Figure 3A:
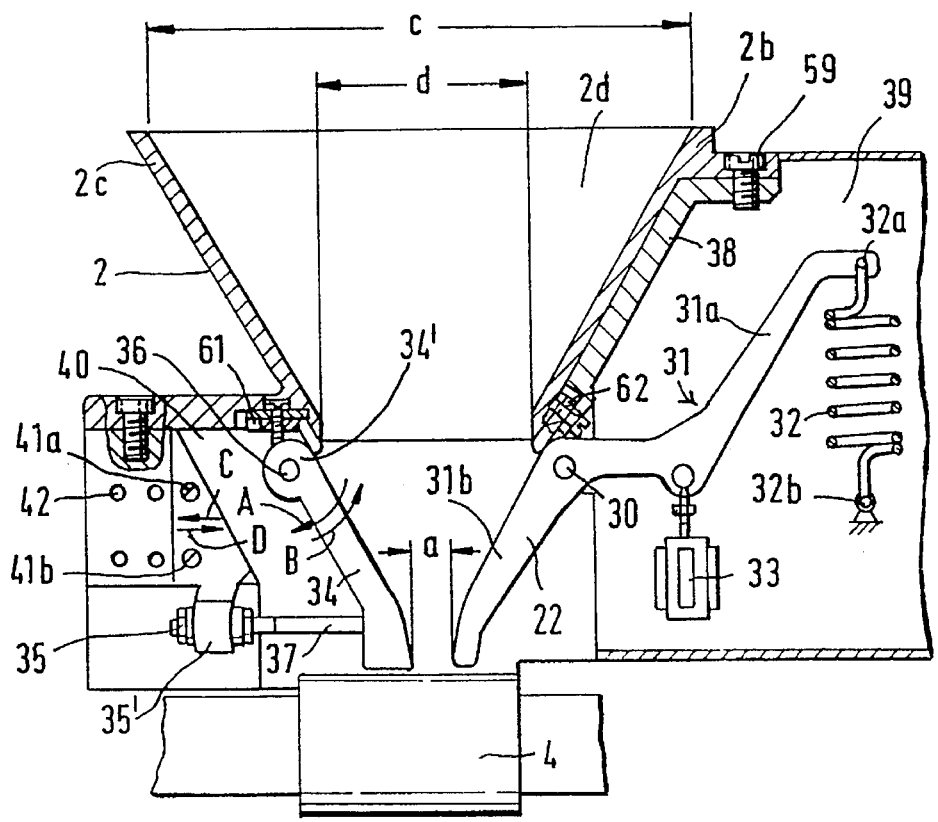
FIG. 3a is a sectional top plan view of a preferred embodiment, showing structural details and illustrating the construction in a first setting.
Figure 3B:
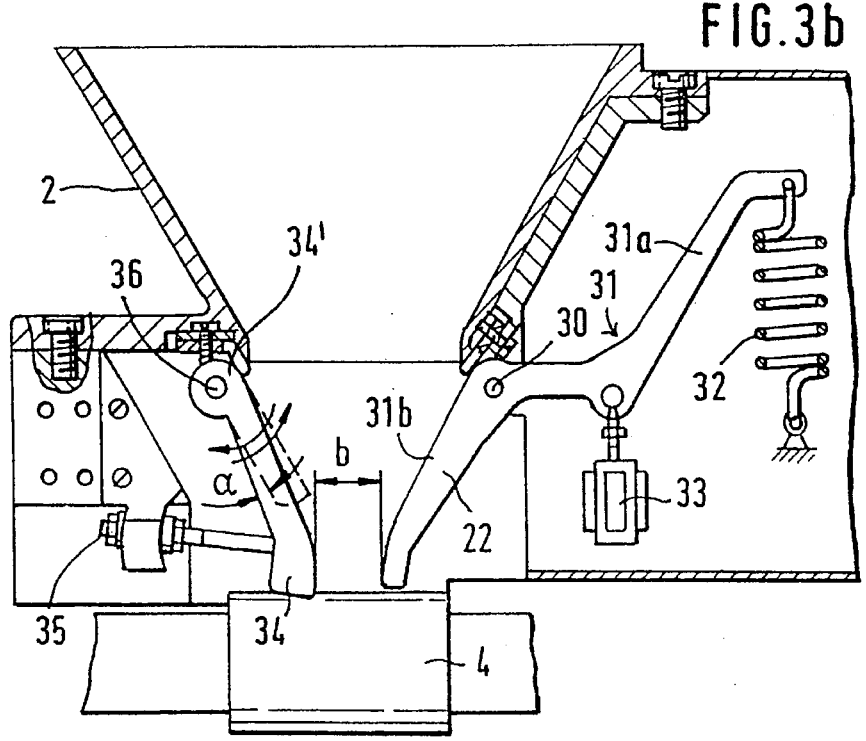
FIG. 3b is a view similar to FIG. 3a, illustrating the construction in a second setting.
Figure 5:
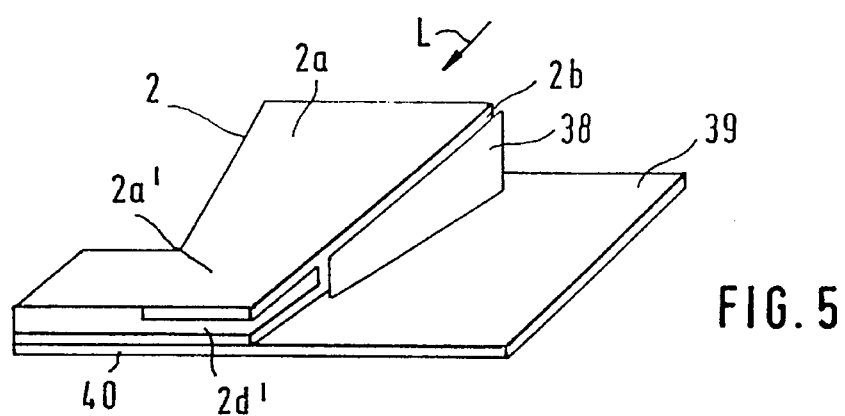
FIG. 5 is a perspective view of a sliver guiding device according to a preferred embodiment of the invention.

FIGS. 3a, 3b and 5 show the apparatus for measuring the thickness of a sliver assembly formed of slivers 3. The guiding device 2 has four walls 2a, 2b, 2c and 2d, of which at least two oppositely located walls converge towards one another in the downstream direction, that is, in the sliver advancing direction L. The walls 2a–2d cause the slivers 3 to converge and assume a side-by-side position in a single plane to form the sliver assembly. As the sliver assembly exits from the device 2, it enters the withdrawing rollers 4 and 5 after which the sliver assembly is dissolved as the individual slivers 3 assume a divergent course. In the downstream zone of the sliver guiding device the pivotal sensor element 22 is arranged which, together with the facing counterelement 34 forms the constriction 23 for the sliver assembly. The change in position of the sensor element 22 caused by a thickness variation of the sliver assembly applies mechanical signals to a transducer 33 which, accordingly, emits electric control pulses.

The counterelement 34 is pivotal in the direction of the arrows A, B about the axis of a rotary bearing (pivot pin) 36 parallel to the plane in which the slivers 3 are arranged side-by-side. The rotary bearing 36 is arranged at the outlet end of the guide wall 2c, as best seen in FIG. 3a and supports the counterelement 34 at an end 34' thereof. The counterelement 34 may be adjusted and immobilized in the adjusted position, for example, by a setscrew 35 having a stem 37 engaging the counterelement 34 at a location spaced from the pivot pin 36. The setscrew 35 is held in a support bracket 35'. The support bracket 35' and the rotary bearing 36 are secured in threaded bores 42 in a base plate 40 by means of screws 41a, 41b, and are laterally shiftable to new adjusted positions as indicated by the arrows C and D. The sensor element 22 and the counterelement 34 project through the lateral walls 2b and 2c. By means of the setscrew 35 the counterelement 34 is rotated about the rotary axis 36, for example, when the processed silver type is changed (the drawing frame 1 is inoperative during such changing operation), so that the distance between the counterelement 34 and the sensor element 22 is, in the constriction 23, changed from the distance a (FIG. 3a) to the distance b (FIG. 3b). At the same time, the angle α between the wall 2c and the counterelement 34 is also changed. The sensor element 22 biased by the spring 32 engaging the lever arm 31a of the sensor element 22 reacts to all changes of thicknesses of the throughgoing slivers 3, as a result of which the distance between the sliver engaging tip of the sensor element 22 and the finely adjusted counterelement 34 varies as a function of the thickness fluctuations. As it may be observed in FIGS. 3a and 3b, the silver-engaging surface of the counterelement 34 is such that in any pivotal position of the counterelement 34, the sliver assembly passes smoothly from the walls of the device 2 onto the sliver-engaging surface of the counterelement 34.

As seen in FIG. 3a, the sliver guiding device 2 has two opposite, converging side walls 2b, 2c having an inlet width c and an outlet width d. The side wall 2b lies with its outer face against a web-like holding element 38 which, as best shown in FIG. 5, is secured to a base plate 39. The holding element extends perpendicularly to the base plate 39 and parallel to the side wall 2b.

Figure 4:
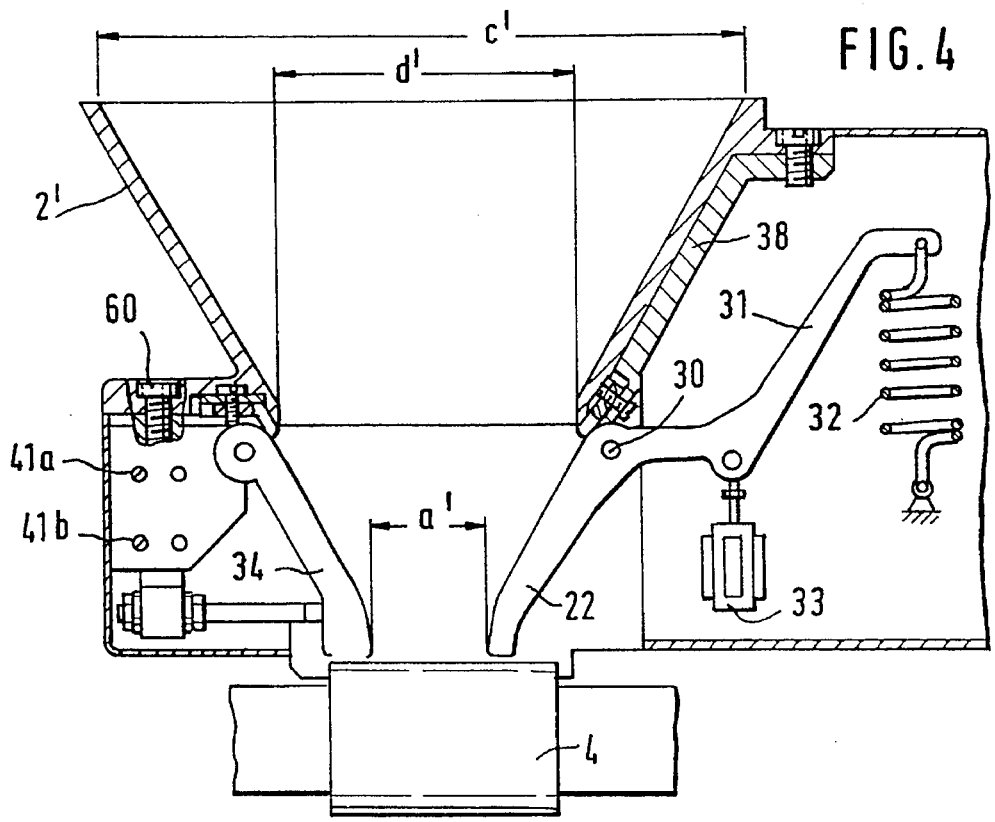
FIG. 4 is a sectional top plan view of a preferred embodiment, showing structural details and illustrating the construction in a third setting by virtue of component replacement.
Figure 4A:
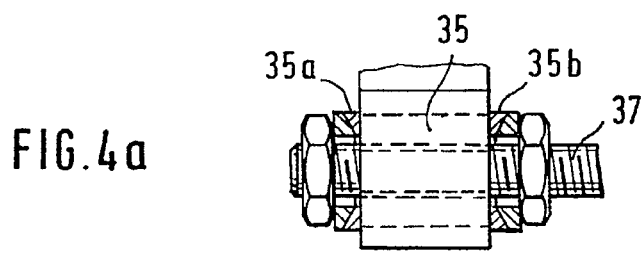

In the construction shown in FIG. 4, the sliver guiding device 2 of the earlier described embodiment is replaced by a sliver guiding device 2' having a greater inlet width c' and a greater outlet width d' than the respective dimensions c and d of the sliver guiding device 2. The converging walls of the sliver guiding device 2' are inclined at a different angle than in the sliver guiding device 2. As an alternative, it may be feasible to nest a smaller sliver guiding device in a permanently attached sliver guiding device of larger dimensions. A replacement of a sliver guiding device 2' for a sliver guiding device 2 is effected, for example, because of a change in the type of the sliver to be processed by the drawing frame.

Reverting to FIG. 5, the guide wall 2a in the zone of the constriction 23, that is, in the zone of the outlet of the sliver guiding device 2 for the fiber slivers 3, has a zone 2a' which faces a zone 2d' of the guide wall 2d. The lateral walls 2b and 2c include a slot in the zone of the constriction 23 so that the sensor element 22 and the counterelement 34 may project therethrough and may engage, under pressure, laterally opposite sides of the sliver assembly composed of the side-by-side arranged slivers 3. The base surface 2d' merges into the base plates 39 and 40 situated externally of the sliver guiding device 2.

Turning to FIGS. 6a and 6b, the sensor element 22 is a lever pivotal about the bearing 30 and has lever arms 31a and 31b extending in opposite directions from the bearing 30. The lever 31 is swingable as indicated by the arrows E and F. At the end of the lever arm 31a, the sensor element 22 is engaged by a tension spring 32, whose other end is secured to a single-arm adjusting lever 43 which is rotatable about a pivot 44 in the direction of the arrows G and H. The free outer end of the lever 43 may form a manually engageable handle. The pivot 44 is secured to the base plate 39. In case the setting lever—which may be immobilized by detents—is moved from its position shown in FIG. 6a in the direction of the arrow H into the position shown in FIG. 6b, the securing location of the spring 32 is changed, whereby the bias and thus the spring force exerted on the sensor element 22 is altered. The base plate 39 has detents 45 and 46 such as slots and bolts for determining positions for the setting lever 43.

Figure 7A:
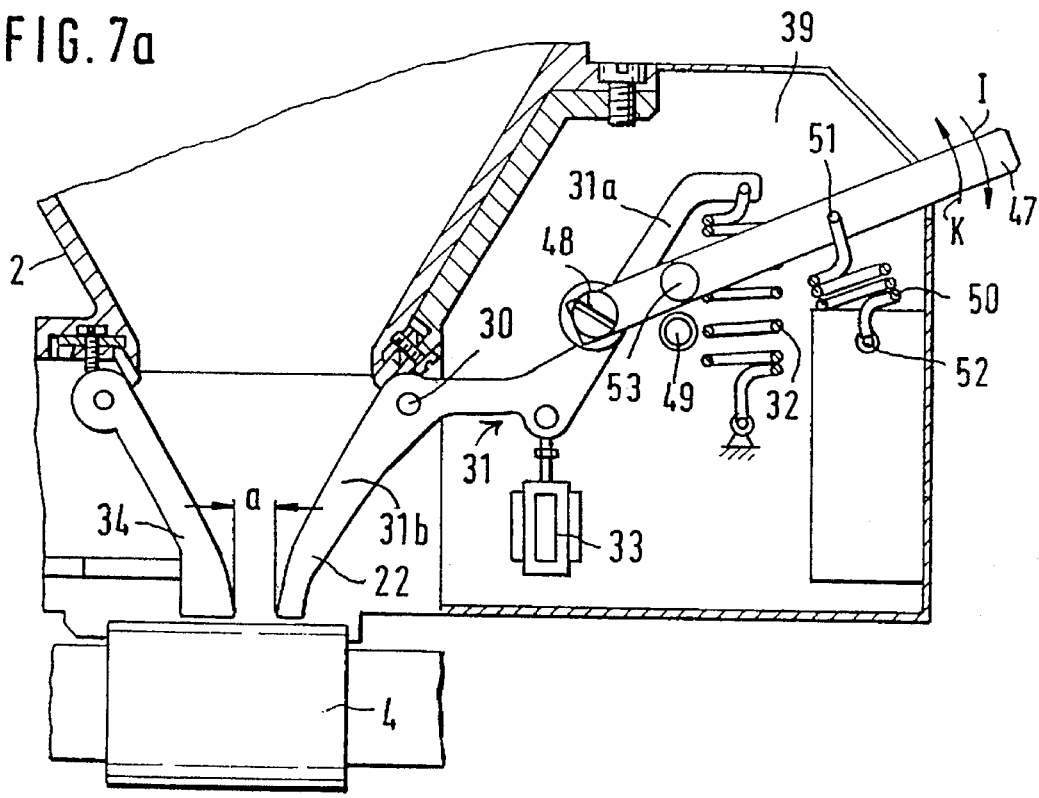
FIGS. 7a and 7b are sectional top plan views of yet another preferred structural embodiment of the invention, showing two operational positions.
Figure 7B:
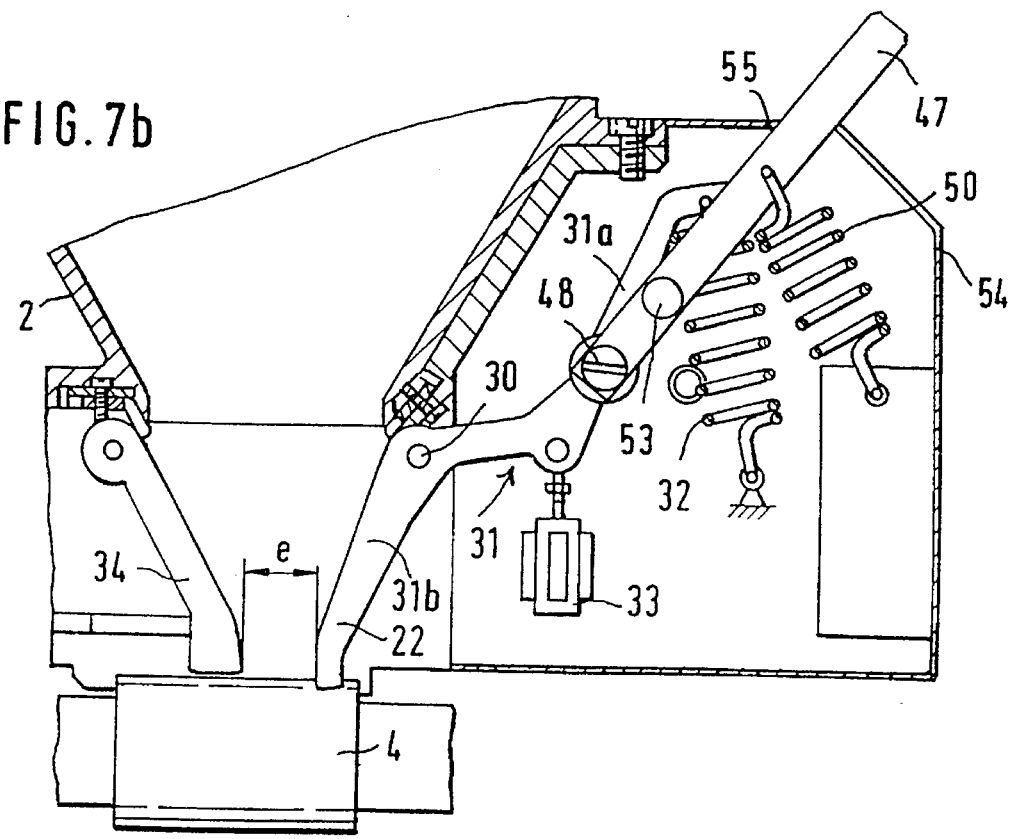

FIGS. 7a and 7b show a single-arm pivotal lever 47 which is swingable in the direction of the arrows I and K about a pivot 48 secured to the base plate 39. One end of a tension spring 50 is connected to the pivotal lever 47 at a location 51, while the other end of the tension spring 50 is secured to a stationary spring support 52. On the pivot lever 47 a carrier element, for example, a pin 53 is provided which is connected with the lever arm 31a of the lever 31 forming the sensor element 22. In case the pivot lever 47 is moved from its position shown in FIG. 7a in the direction of the arrow I into the position shown in FIG. 7b, then by virtue of the pressure by the pin 53 the lever arm 31a is shifted, as a result of which the distance between the sensor element 22 and the counterelement 34 is increased from a (FIG. 7a) to e (FIG. 7b). In this manner, the opening in the zone of the fiber outlet is significantly increased to what may be termed as a servicing opening e. The servicing opening e facilitates a thread-in operation for the slivers 3 upon a start of operation or readily permits a cleaning of the inner surfaces of the sliver guiding device 2. The immobilizing or detent devices for the pivot lever 47 (such as wall apertures) are designated at 54 and 55.

Figure 8:
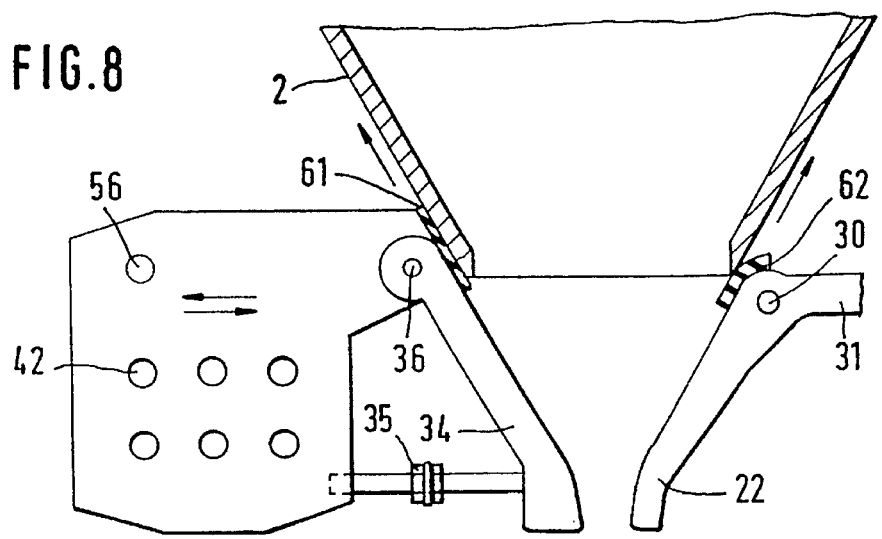
FIGS. 8, 9 and 10 are schematic sectional top plan views of three additional preferred embodiments of the invention.

In FIG. 8, the rotary bearing 36 supporting the counterelement 34 and the setting device including the setscrew 35 are mounted on a shifting element 56, whose position may be changed and which may be immobilized by screws received in threaded bore holes 42 of the base plate 40, as shown in FIG. 3a. Between the side walls 2b and 2c of the sliver guiding device 2 on the one hand and the sensor element 22 and the counterelement 34 on the other hand, respective rubber seals 62 and 61 are arranged, as also shown in FIG. 3a.

Figure 9:
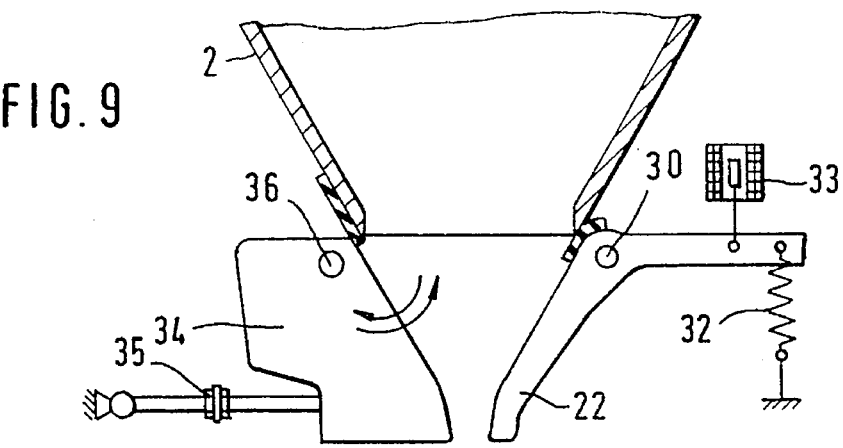

According to FIG. 9, the counterelement 34 is rotatably mounted on the bearing 36.

Figure 10:
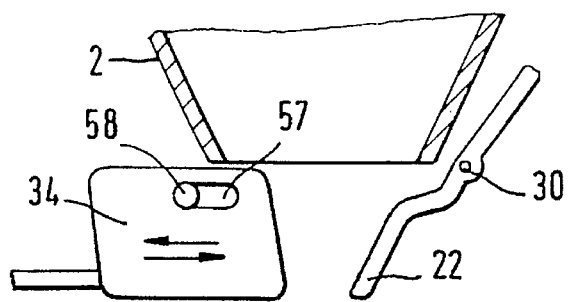

Turning to FIG. 10, the counterelement 34 is provided with a slot 57 through which a screw 58 extends. This arrangement provides for both a pivotal and a linear shifting motion of the counterelement 34. The screw 58, in addition to functioning as a pivot and a linear guide, also serves for immobilizing the counterelement 34 in its set position.

It will be understood that the above description of the present invention is susceptible to various modifications, changes and adaptations, and the same are intended to be comprehended within the meaning and range of equivalents of the appended claims.

What is claimed is:

1. An apparatus for measuring sliver thickness in a drawing frame, comprising
   (a) a sliver guiding device including
      (1) an inlet for simultaneously receiving a plurality of side-by-side running slivers having an advancing direction;
      (2) sliver combining means defining a plane extending parallel to said advancing direction for bringing the slivers together to form a sliver assembly constituted by a plurality of side-by-side positioned running slivers arranged in said plane and laterally contacting one another; the sliver assembly having oppositely located first and second outermost slivers; said sliver combining means comprising oppositely located, converging wall surfaces;
      (3) an outlet for discharging the sliver assembly from said sliver guiding device;
   (b) a sensor element contacting said first outermost sliver at said outlet;
   (c) first positioning means for movably supporting said sensor element;
   (d) a counterelement contacting said second outermost sliver at said outlet;
   (e) second positioning means for pivotally supporting said counterelement for a swinging motion parallel to said plane; said second positioning means including
      (1) a rotary bearing supporting said counterelement; and
      (2) means for displaceably supporting said rotary bearing;
   (f) adjusting means for changing a position of said counterelement and for immobilizing said counterelement in an adjusted state;
   (g) biasing means for urging said sensor element into a resilient contact with said first outermost sliver in a direction towards said second outermost sliver, whereby said sensor element undergoes excursions upon variation of thickness of said sliver assembly in said plane; said sensor element and said counterelement together defining a restriction through which said sliver assembly passes; said sensor element and said counterelement forming part of said combining means;
   (h) transducer means for converting excursions of said sensor element into electric pulses;
   (i) a withdrawing roller pair supported downstream of said sliver guiding device as viewed in said advancing direction; said withdrawing roller pair defining a nip through which the sliver assembly passes; and
   (j) means for driving said withdrawing roller pair for pulling said sliver assembly through said sliver guiding device.

2. The apparatus as defined in claim 1, wherein said sensor member and said counterelement extend through respective said converging wall surfaces.

3. An apparatus for measuring sliver thickness in a drawing frame, comprising
   (a) a sliver guiding device including
      (1) an inlet for simultaneously receiving a plurality of side-by-side running slivers having an advancing direction;
      (2) sliver combining means defining a plane extending parallel to said advancing direction for bringing the slivers together to form a sliver assembly constituted by a plurality of side-by-side positioned running slivers arranged in said plane and laterally contacting one another; the sliver assembly having oppositely located first and second outermost slivers; said sliver combining means comprising oppositely located, converging wall surfaces;

(3) an outlet for discharging the sliver assembly from said sliver guiding device; p1 (b) a sensor element contacting said first outermost sliver at said outlet;

(c) first positioning means for movably supporting said sensor element;

(d) a counterelement contacting said second outermost sliver at said outlet;

(e) second positioning means for pivotally supporting said counterelement for a swinging motion parallel to said plane; said second positioning means including a stationarily held pivot pin;

(f) adjusting means for changing a position of said counterelement and for immobilizing said counterelement in an adjusted state; said adjusting means including a slot provided in said counterelement; said counterelement being supported and guided for rotary and shifting motions by said pivot pin in and along said slot;

(g) biasing means for urging said sensor element into a resilient contact with said first outermost sliver in a direction towards said second outermost sliver, whereby said sensor element undergoes excursions upon variation of thickness of said sliver assembly in said plane; said sensor element and said counterelement together defining a restriction through which said sliver assembly passes; said sensor element and said counterelement forming part of said combining means;

(h) transducer means for converting excursions of said sensor element into electric pulses;

(i) a withdrawing roller pair supported downstream of said sliver guiding device as viewed in said advancing direction; said withdrawing roller pair defining a nip through which the sliver assembly passes; and (j) means for driving said withdrawing roller pair for pulling said sliver assembly through said sliver guiding device.

4. An apparatus for measuring sliver thickness in a drawing frame, comprising (a) a sliver guiding device including
(1) an inlet for simultaneously receiving a plurality of side-by-side running slivers having an advancing direction;
(2) sliver combining means defining a plane extending parallel to said advancing direction for bringing the slivers together to form a sliver assembly constituted by a plurality of side-by-side positioned running slivers arranged in said plane and laterally contacting one another; the sliver assembly having oppositely located first and second outermost slivers; said sliver combining means comprising oppositely located, converging wall surfaces;
(3) an outlet for discharging the sliver assembly from said sliver guiding device;

(b) a sensor element contacting said first outermost sliver at said outlet;

(c) first positioning means for movably supporting said sensor element;

(d) a counterelement contacting said second outermost sliver at said outlet;

(e) a fixedly supported base plate;

(f) second positioning means for pivotally supporting said counterelement for a swinging motion parallel to said plane; said second positioning means including (1) a bearing supporting said counterelement for angular movements; said bearing being mounted on said base plate;
(2) a setscrew engaging said counterelement; and
(3) means for mounting said setscrew at selected locations of said base plate;

(g) adjusting means for changing a position of said counterelement and for immobilizing said counterelement in an adjusted state;

(h) biasing means for urging said sensor element into a resilient contact with said first outermost sliver in a direction towards said second outermost sliver, whereby said sensor element undergoes excursions upon variation of thickness of said sliver assembly in said plane; said sensor element and said counterelement together defining a restriction through which said sliver assembly passes; said sensor element and said counterelement forming part of said combining means;

(i) transducer means for converting excursions of said sensor element into electric pulses;

(j) a withdrawing roller pair supported downstream of said sliver guiding device as viewed in said advancing direction; said withdrawing roller pair defining a nip through which the sliver assembly passes; and (k) means for driving said withdrawing roller pair for pulling said sliver assembly through said sliver guiding device.

5. An apparatus for measuring sliver thickness in a drawing frame, comprising (a) a sliver guiding device including
(1) an inlet for simultaneously receiving a plurality of side-by-side running slivers having an advancing direction;
(2) sliver combining means defining a plane extending parallel to said advancing direction for bringing the slivers together to form a sliver assembly constituted by a plurality of side-by-side positioned running slivers arranged in said plane and laterally contacting one another; the sliver assembly having oppositely located first and second outermost slivers; said sliver combining means comprising oppositely located, converging wall surfaces having upstream and downstream ends as viewed in said advancing direction;
(3) an outlet for discharging the sliver assembly from said sliver guiding device;

(b) a sensor element contacting said first outermost sliver at said outlet;

(c) positioning means for movably supporting said sensor element (d) a counterelement having a surface contacting said second outermost sliver at said outlet; said counterelement having opposite first and second ends;

(e) a rotary bearing located immediately at the downstream end of one of said converging wall surfaces for pivotally supporting said counterelement at said first end thereof for a swinging motion of said counterelement parallel to said plane; said surface of said counterelement being such that in any pivotal position of said counterelement the sliver assembly passes smoothly from said downstream end of said one converging wall surface onto said surface of said counterelement;

(f) adjusting means for changing a position of said counterelement and, for immobilizing said counterelement in an adjusted state;

(g) biasing means for urging said sensor element into a resilient contact with said first outermost sliver in a direction towards said second outermost sliver, whereby said sensor element undergoes excursions upon variation of thickness of said sliver assembly in said plane; said sensor element and said counterelement together defining a restriction through which said sliver assembly passes; said sensor element and said counterelement forming part of said combining means;

(h) transducer means for converting excursions of said sensor element into electric pulses;

(i) a withdrawing roller pair supported downstream of said sliver guiding device as viewed in said advancing direction; said withdrawing roller pair defining a nip through which the sliver assembly passes; and (j) means for driving said withdrawing roller pair for pulling said sliver assembly through said sliver guiding device.

* * * * *